United States Patent Office 2,875,830
Patented Mar. 3, 1959

2,875,830

METHOD OF RECOVERY OF OIL BY INJECTION OF HYDROCARBON SOLUTION OF CARBON DIOXIDE INTO OIL STRUCTURE

James W. Martin, Tuckahoe, N. Y., assignor to Oil Recovery Corporation, New York, N. Y., a corporation of New York No Drawing. Application February 4, 1954
Serial No. 408,309

11 Claims. (Cl. 166—7)

The present invention relates to an improved method of secondary recovery of oil, and, more particularly, to an improved method of secondary recovery of oil from oil sands by the injection of hydrocarbon solution of carbon dioxide therein.

Those skilled in the petroleum industry known that oil and gas migrated from their original source, known as "source rocks," in which the parent organic matter was deposited, through "carrier beds" to the "reservoir rocks" in which they were accumulated and stored by nature. Upward escape of the reservoir fluid was prevented by impervious "cap rock." An oil and gas reservoir may be defined by a body of porous and permeable rock containing oil and gas through which fluids may move toward recovery openings or wells under the pressures that exist or that can be applied. Sands, sandstones, and limestones were formed as a result of processes of sedimentation in which mineral fragments of assorted size or shapes were gradually fitted together under water, later to be compacted by weight of superimposed strata. Pore openings in limestone are frequently much less uniform in shape and size than those in sands and sandstone. Rock openings were, in many cases, formed by solution and watering and were extremely irregular in shape and distribution. The storage capacity afforded by rock stratum for fluids is measured solely by its interstitial pore space or pore volume. This body of porous rock is known as "an oil sand" regardless of its mineral composition. A cubic foot of sand or sandstone presents a very large surface to the fluid stored within it and a vast number of individual communicating pores were formed between the grain comprising it. Porosities in excess of 30% are uncommon and most commercial oil sands range between 15% and 25%. The permeability of a reservoir rock or oil sand, usually expressed in "millidarcys," is a measure of the resistance offered to the movement of fluids through its pore spaces.

It is well known that petroleum usually occurs in porous structures in the earth from which rarely as much as 50%, often only 30%, of the total oil can be lifted to the surface of the ground by ordinary oil well practice. Likewise, it is also known that the useful life of an oil well is limited. For instance, the U. S. Bureau of Mines is authority for the statement that more than three-fourths of this nation's oil wells are now "strippers" draining fields that once produced "gushers" or flowing wells. Those skilled in the art in the oil industry are well aware that eventually the flow of oil into the "strippers" will become so slow as to render them uncommercial or "spent." Further, it is realized that vast areas contain oil-bearing structures which contain oil in insufficient proportion to flow in commercial quantities. To recover the residual oil, in some cases a pressure drive has been applied by pumping water into the structure known as water flooding. In other cases, air or natural gas or other gas has been pumped into the structure to produce a pressure within the oil sand, known as a gas drive. (See U. S. Patent Nos. 1,067,868 to L. Dumin; 1,249,232 to Frederick Squires; 1,688,586 to J. O. Lewis; 1,826,371 to P. J. Spindler; and 1,978,655 to H. R. Straight.) None of the prior methods has proved universally successful and at best these methods serve only to mechanically force the fluid or non-absorbed oil from the porous structures by replacement. For instance, Squires pointed out that the use of air created a dangerous, highly explosive mixture in the reservoir and that natural gas was generally too expensive. Squires proposed the use of exhaust gas from internal combustion engines and the use of flue gas from stacks in place of air or natural gas. Exhaust gas from a gasoline engine usually contains 79% of nitrogen, 2% oxygen, 6% carbon monoxide, and 9% of carbon dioxide (balance largely hydrogen and methane). Exhaust gas from a gas engine as used in an oil field is about 88% nitrogen and about 11% carbon dioxide; whereas, flue gas usually contains 84% of nitrogen, 2% of oxygen, 1% carbon monoxide, and 12% of carbon dioxide (balance largely water vapor, hydrogen etc. Squires contemplated pumping water and gas into the strata and the thought that the action of the gas would be to volatilize part of the crude oil and that the water would agitate the liquid hydrocarbons in the strata and thus promote the volatilizing or distilling action of the gas. In fact, Squires preferred using hot water to better bring about the volatilization of the hydrocarbons. (See U. S. Patents Nos. 1,238,355 and 1,249,232. Then again, Russell proposed the introduction of gas into the oil in order to produce and distribute gas bubbles to which the oil would be attracted as a film. (See U. S. Patents Nos. 1,511,067 and 1,658,305.) Furthermore, Cloud suggested the use of water gas alone or with acetylene. The preferred percentage of acetylene is from 15% to 30%. (See U. S. Patent No. 1,697,260.) As is well known, water gas usually contains approximately 48% hydrogen, 38% carbon monoxide, 7.2% nitrogen, 5% carbon dioxide, 1.2% hydrocarbons and 0.6% oxygen. (See Mark's Mechanical Engineers Handbook, page 822, Revised 5th edition, 1951.) Processes for treating oils or hydrocarbon with carbon dioxide (as a liquid or as a gas) were disclosed by Auerbach and also by Pilat & Godlewicz for the purpose of effecting a separation and purification of oils and hydrocarbon mixtures into light fractions and heavy fractions. (See U. S. Patents Nos. 1,805,751; 2,029,120; 2,188,013; 2,315,131; and 2,631,966.) When carbon dioxide is so used in oil recovery, the lighter fractions are removed and the heavier fractions including waxes, asphalts, etc., remain and clog the interstices within the oil sand and retard or prevent any further recovery of oil.

The problem confronting the art has been to find a practical, feasible and economical process of recovering oil from spent oil fields.

I have discovered that the flooding of oil-bearing sand, etc., with a solution of carbon dioxide in a light hydrocarbon has a substantially beneficial effect in rendering the oil in such sand more fluid and more readily removable there by promoting the recovery of oil from such sand. By the term "hydrocarbon solution of carbon dioxide" is meant any mixture containing essentially hydrocarbons and carbon dioxide or their interaction products in which the resultant product is completely in the liquid phase. The term "light hydrocarbon" refers to any low boiling fractions (B. P. below 350° C.) of petroleum which are liquid under the temperature-pressure conditions in the oil sand in which they are to be injected. They may be of any type, such as paraffins, naphthenes, aromatics, etc.

It is an object of the present invention to provide an improved method for the secondary recovery of oil by injecting a controlled amount or concentration of a hydrocarbon solution of carbon dioxide into oil-bearing sand, etc., thereby providing a solvent for crude oil which will render the crude oil more fluid in the oil reservoir and thus more readily forced out of the oil sand.

Another object of the invention is to provide an improved method for the secondary recovery of oil involving the use of a solution of carbon dioxide in hydrocarbons functioning like a solvent for the heavier and less fluid crude oils thereby rendering them more susceptible to movement through the oil sand.

The invention also contemplates providing an improved method for the secondary recovery of oil which utilizes a hydrocarbon solution of carbon dioxide which reduces the surface tension of the oil and to produce within the oil reservoir surface active compounds which act on the surface of the sand particles thereby releasing crude oil so that it may be more readily recovered.

It is a further object of the invention to provide an improved method for the secondary recovery of oil by injecting a controlled amount and concentration of carbon dioxide dissolved in hydrocarbons into oil-bearing sand, etc., whereby the amount and concentration of carbon dioxide carried into the sand is such that none of the carbon dioxide will evolve in the gas phase.

It is also within the contemplation of the invention to provide an improved method for the secondary recovery of oil in which the solvent after it has passed through the oil sand readily separates from the recovered crude oil and may be recycled into the oil reservoir.

Other objects and advantages will become apparent from the following description of a preferred embodiment of the invention.

Generally speaking, the present invention contemplates the use of carbon dioxide encompassed in a relatively small volume of fluid under selected pressures for injection into oil-bearing sand in which the fluid functions as a combination of a carrier for carbon dioxide and a solvent for oil whereby the secondary recovery of oil can be improved.

In carrying the invention into practice, it is preferred to produce a solution of carbon dioxide in hydrocarbons on the site and inject or introduce such solution in oil-bearing sand by pumping said solution therein.

It is also suggested that when carbon dioxide and hydrocarbons are injected separately into the oil reservoir at the base of the injection well under a pressure above that of mean reservoir pressure at which to permeate the oil sand, the necessary mixing and dissolving of carbon dioxide in the hydrocarbons will occur in the well bore and in the oil sand adjacent to the injection well. Such a procedure contemplates the injection of pre-calculated proportions of carbon dioxide gas and hydrocarbons to form the desired solution.

After the solution of carbon dioxide in light hydrocarbons has been injected, the oil reservoir may be subjected to a normal water flood with uncarbonated water or gas drive to propel this solvent through the oil sand thus forcing the treated crude oil to and out through a producing oil well.

It has been found that a solution of carbon dioxide in a light hydrocarbon improves that hydrocarbon as a vehicle for the effective recovery of crude oil. The improvement in recovery action is effected among other things by the following:

(1) At increasing pressures carbon dioxide is increasingly more soluble in light hydrocarbons and the hydrocarbon is substantially increased in volume by this solution of carbon dioxide so that the original volume of the hydrocarbon serves to dilute or "to thin" a larger volume of crude oil.

(2) The light hydrocarbon is substantially decreased in viscosity at any oil reservoir pressure and temperature by the admixture of carbon dioxide and is thus increased in efficiency as a solvent.

(3) The surface tension of a light hydrocarbon is decreased by the admixture of carbon dioxide to such an extent that the hydrocarbon more readily penetrates the oil-soaked sand and aids in separating the crude oil adhering to the sand.

It is to be noted that the solubility of carbon dioxide in light hydrocarbons is high. For example, one cubic foot of certain light hydrocarbons at pressures and temperatures commonly found in oil reservoirs (e. g., 1000 p. s. i. and 100° F.) may dissolve in excess of 1200 cubic feet of carbon dioxide at normal temperatures and pressures (N. T. P.).

As a carrier of carbon dioxide, these light hydrocarbons are far more efficient than water. A cubic foot of water at 1000 p. s. i. and 100° F. may dissolve 26 cubic feet of carbon dioxide and swell, say, to 10% greater volume because of the carbon dioxide in solution. A cubic foot of the light hydrocarbon decane may dissolve about 1200 cubic feet of carbon dioxide and swell to about twice its volume. In the case of water, one cubic foot of the carbonated liquid will contain 24 cubic feet of carbon dioxide, and in the case of the light hydrocarbon each cubic foot of the carbonated liquid will contain 600 cubic feet of carbon dioxide. Thus as carriers of carbon dioxide, carbonated water and carbonated light hydrocarbons are in a ratio of 1:25.

It can be shown that carbon dioxide contained in the solution of light hydrocarbon will be neutralized by the alkali-earth compounds in an oil sand up to that amount necessary to saturate water with the resulting alkali-earth bicarbonates formed by the reaction.

In the use of carbon dioxide dissolved in light hydrocarbons as a flooding medium for oil reservoirs, no water is present in the oil sand except the connate water.

It has been found that the amount of carbon dioxide in water solution should be above 20% of its maximum solubility in order to neutralize the alkali-earth radicals which will bring about the foregoing saturation. This proportion of carbon dioxide to water can be brought about if the water is brought in contact with a carbonated hydrocarbon of higher percent carbonation. It has been found that a hydrocarbon of less than 20% of full carbonation is ineffective practically in bringing substantially improved results in oil recovery. Thus, as a lower limit of carbon dioxide concentration in light hydrocarbons, 20% of full carbonation of liquid hydrocarbon has been found to be satisfactory. Full carbonation is defined as the maximum solubility of carbon dioxide in the hydrocarbons at the mean pressure and temperature of the oil reservoir.

It is essential to this process that no substantial volume of carbon dioxide gas pass over the crude oil in the oil reservoir. This establishes the upper limit of concentration of the carbonated light hydrocarbon as 100% of full saturation at reservoir pressures and temperature. The presence of more carbon dioxide than can remain in solution in the hydrocarbons under reservoir conditions would cause separation of the heavy fractions in the crude oil with which it came in contact and plugging of the oil sand would occur.

It is preferable for commercial and industrial reasons that the concentration of carbon dioxide not exceed 80% of full saturation and this is the preferred upper limit in actual practice. However, no harm to the efficiency of the process is done until super-saturation is achieved and carbon dioxide gas is evolved in the oil reservoir.

The pressures to be employed will depend upon local conditions in the oil field under treatment. As those skilled in the art know, the pressures vary in different fields. For example, the following reservoir pressures are those of record of water floods in the various major areas of the country:

| Area | Reservoir Pressure, p. s. i. |
|---|---|
| Penn Grade Area (most of the Eastern States) | 600-2,000 |
| Tri-State Area | 200-1,500 |
| Mid-Continent Area | 200-1,500 |
| Gulf Coast Area | 200-3,000 |

It is to be understood that these pressures are of a very general nature and some water floods may occur at pressures outside of the ranges given hereinabove. Generally stated, a reservoir pressure is a "synthetic" or "artificial" pressure controlled by the pressure on the injection or input well and the pressure on the production or output well. The maximum pressure is limited by the weight of the overburden as it affects the structural strength of the cap rock.

For the purpose of giving those skilled in the art a better understanding of the invention and a better appreciation of the advantages of the invention, the following illustrative example is given:

Example

In carrying the present invention into practice, the oil field is equipped with an input well and an output well. The input well is provided with injection devices by the use of which fluids can be pumped into oil-bearing sand of an oil field. An adequate amount of carbonated light hydrocarbon is supplied to furnish a predetermined amount of carbon dioxide in the oil sand for the removal of oil and in sufficient concentration to bring about the desired effect but insufficient to produce or release gas within the oil reservoir.

After an adequate amount and concentration of carbonated hydrocarbon has been injected into the sand to bring about the desired effect, I prefer to inject carbonated water first, followed by uncarbonated water or brine into the inlet well to wash or drive any residual treated crude oil or petroleum from the sand up through the outlet well.

The minimum volume of carbonated light hydrocarbon, in order to have any beneficial effect on oil recovery, must be such that the carbon dioxide content be sufficient to more than charge the connate water to more than 20% of its full carbonation. As an approximation under ordinary reservoir conditions, this requires at least six volumes of carbon dioxide per volume of water. This means that the ratio of carbon dioxide to connate water must be 6:1. The connate water content of most commercially floodable oil reservoirs is between 15% and 30% of the pore volume. Thus the carbon dioxide in the injected liquid must exceed about one to two pore volumes in order to be at a 6:1 ratio. This can also be stated that the total carbon dioxide injected as part of the carbonated light hydrocarbon shall substantially exceed 6 connate water pore volumes.

One of the reservoir liquids is connate water. It is a saline water which exists in all oil sands and is usually found in amounts equal to about 15% to about 30% of the reservoir pore volume.

For most economical results, the injection of the oil sand with a carbon dioxide-hydrocarbon mixture is followed by a supplementary injection of the oil sand with carbonated water. The details of this operation are more fully disclosed in my co-pending application, Serial No. 101,688. By using this procedure, a substantial dilution is avoided of the carbon dioxide remaining in the oil sand behind the wave or bank of oil which will not only tend to rob the carbonated hydrocarbons of their carbon dioxide content, but will also tend to precipitate alkaline earth carbonates in the sand and thus plug the pores of the oil sand and limit the permeability.

It has been determined that the preferred concentration of carbonated light hydrocarbon is 40% to 80% of saturation at mean reservoir pressure and in amounts of 10% to 20% of a reservoir pore volume.

As a definition of terms used in this application, it can be stated that a pore volume is the space in an oil reservoir not occupied by a solid. A connate water pore volume is the volume of connate water contained in an oil reservoir. It is normally about 15% to 30% of a pore volume in sands commercially susceptible to secondary recovery. An oil pore volume is the volume of oil (crude oil) contained in an oil reservoir. It is normally about 30% to 50% of pore volume at the beginning of secondary recovery. These pore volumes are often expressed in barrels/acre/foot of the oil reservoir.

An oil structure is any geological structure, strata, oil sand, reservoir rock, oil reservoir, etc., in which oil naturally has accumulated.

Percent carbonation means the amount of carbon dioxide dissolved in the hydrocarbon in relation to the full amount of carbon dioxide which can be dissolved in that hydrocarbon under similar temperature-pressure conditions. Thus, 20% carbonation means that the hydrocarbon has dissolved in it 20% of the maximum volume of carbon dioxide that could dissolve in this hydrocarbon at the same pressure and temperature.

Carbonated water, as used here, means water in which carbon dioxide has been dissolved in amounts between 20% and 100% of full saturation at the pressure and temperature of the oil reservoir in which it is injected.

Injecting is defined to mean the forcing of a fluid into an oil structure by pumping, compressing, by hydrostatic pressure in the input well or a combination of any desired propulsive means.

Bottom hole pressure means a pressure existing at bottom of either the injection or the producing well. Bottom hole pressure is usually given in pounds per square inch. It has two components:

(1) The well head pressure
(2) The static head or the weight of a column of fluid in the well bore.

The static head for water is approximately .43 p. s. i. per foot of depth of the well.

Injection well bottom hole pressure is readily determined in water flooding because the static head of liquid is well known as is the well head pressure at which the liquid is introduced into the well. In the case of the production well, however, the bottom hole pressure can be practically nil in the case where the production well is pumped or a relatively high pressure in the case that the production well is throttled at well head and has a back pressure in addition to the static head of water, oil and gas in the well bore of the outlet well. By control of the well head pressures of injection and production wells, one is able to obtain almost any "mean reservoir pressure" that is desired for the mean reservoir pressure, which actually constitutes the pressure over most of the area of the oil sand between the injection well and the production well, is the mean of the bottom hole pressures of the production and the injection well.

It has been found that the light hydrocarbons mixed with crude oil and carbon dioxide in an oil reservoir will, upon release of pressure in the producing well, evolve from the crude oil as gas along with the carbon dioxide and may be readily separated.

The light hydrocarbons may readily be condensed from the carbon dioxide gas and recovered, or the mixture of light hydrocarbons and carbon dioxide may again be compressed and re-injected in the oil reservoir.

The present application is a continuation-in-part application of my co-pending applications, Serial No. 64,402, filed December 9, 1948, now abandoned and Serial No. 101,688 filed June 27, 1949, now abandoned.

It can be readily appreciated by anyone skilled in the art, that the present improved process may be applied by means of a single well acting as both injection and producing well, either on the batch principle or by means which cause the carbonated light hydrocarbon to enter one section of the oil sand via an inlet well and return from another section via an outlet well.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In the recovery of oil from an underground oil structure in an oil field having at least one input well and at least one output well that improvement which consists essentially in passing under pressure through said oil structure from said input well to said output well light hydrocarbon solution of carbon dioxide, the hydrocarbon having a boiling point below 350° C., the amount of carbon dioxide giving not less than about 20% to not more than 100% carbonation of the light hydrocarbon, and not exceeding the amount of carbon dioxide that will remain in solution at prevailing reservoir conditions, the solution being liquid under the prevailing conditions of the underground structure, whereby oil is recovered from said oil structure.

2. In the recovery of oil from an underground oil structure in an oil field having at least one input well and at least one output well that improvement which consists essentially in injecting 10% to 20% of a pore volume of carbonated light hydrocarbons under pressure through said oil structure via said input well, the hydrocarbons having a boiling point below 350° C., the amount of carbon dioxide giving not less than about 20% to not more than 100% carbonation of the light hydrocarbons and not exceeding the amount of carbon dioxide that will remain in solution at prevailing reservoir conditions, the carbonated hydrocarbons being liquid under the prevailing conditions of the underground structure, thereafter injecting one-third to one and one half pore volumes of carbonated water containing about 20% to about 100% of full carbonation, under pressure through said oil structure, and recovering oil from said oil structure via the output well.

3. In the recovery of oil from an underground oil structure in an oil field having at least one input well and at least one output well that improvement which consists essentially in injecting into an oil structure under pressure of carbonated light hydrocarbons containing about 20% to 100% of carbon dioxide, the hydrocarbons having a boiling point below 350° C., the amount of carbon dioxide giving not less than about 20% to not more than 100% carbonation of the light hydrocarbons and not exceeding the amount of carbon dioxide that will remain in solution at prevailing reservoir conditions, the carbonated hydrocarbons being liquid under the prevailing conditions of the underground structure, thereafter injecting under pressure of carbonated water containing about 20% to about 100% of full carbonation, and following the aforesaid operations with a water flood until oil is recovered from said oil structure via said output well.

4. In the recovery of oil from an underground oil structure in an oil field having at least one input well and at least one output well that improvement which consists essentially in injecting into an oil structure under pressure 10% to 20% of a pore volume of carbonated light hydrocarbons with about 20% to 100% carbonation, the hydrocarbons having a boiling point below 350° C., the amount of carbon dioxide giving not less than about 20% to not more than 100% carbonation of the light hydrocarbons and not exceeding the amount of carbon dioxide that will remain in solution at prevailing reservoir conditions, the carbonated hydrocarbons being liquid under the prevailing conditions of the underground structure, thereafter injecting under pressure one-third to one and one-half pore volumes of carbonated water with about 20% to 100% carbonation, and withdrawing from said output well oil recovered from the aforesaid operations.

5. In the recovery of oil from an underground oil structure in an oil field having at least one input well and at least one output well that improvement which consists essentially in injecting under pressure carbonated light hydrocarbons containing about 20% to about 80% of full carbonation through said oil structure via said input well, the hydrocarbons having a boiling point below 350° C., the carbonated hydrocarbons being liquid under the prevailing conditions of the underground structure, the amount of carbon dioxide present not exceeding that which will remain in solution at prevailing reservoir conditions, thereafter injecting carbonated water containing at least 20% but not above 100% of full carbonation into said input well at least at the aforesaid pressure, and subsequently injecting water at least at the aforesaid pressure into said input well and through said oil structure to force oil therefrom and to said output well for recovery.

6. In the recovery of oil from an underground oil structure in an oil field having at least one input well and at least one output well that improvement which consists essentially in injecting into oil sand under pressure a carbon dioxide-light hydrocarbon mixture containing about 40% to about 80% of full carbonation, the hydrocarbon in the carbon dioxide-hydrocarbon mixture having a boiling point below 350° C., the said mixture being liquid under the prevailing conditions of the underground structure, the amount of carbon dioxide present not exceeding that which will remain in solution at prevailing reservoir conditions, controlling the amount of said mixture injected into said oil sand via said input well to about 10% to about 20% of the pore volume of said oil sand, and injecting carbonated water containing at least 20% but not above 100% of full carbonation into said oil sand via said input well under at least the aforesaid pressure and at least in the aforesaid amount.

7. In the recovery of oil from an underground oil structure in an oil field having at least one input well and at least one output well that improvement which consists essentially in passing under pressure through said oil structure from said input well to said output well light hydrocarbon solution of carbon dioxide, the hydrocarbon having a boiling point below 350° C., the amount of carbon dioxide giving not less than about 20% to not more than 100% carbonation of the light hydrocarbon, and not exceeding the amount of carbon dioxide that will remain in solution at prevailing reservoir conditions, the solution being liquid under the prevailing conditions of the underground structure, whereby oil is recovered from said oil structure, and separating recovered oil from the light hydrocarbons and carbon dioxide.

8. In the recovery of oil from an underground oil structure in an oil field having at least one input well and at least one output well that improvement which consists essentially in injecting about 10% to 20% of a pore volume of carbonated light hydrocarbons under pressure through said oil structure via said input well, the hydrocarbons having a boiling point below 350° C., the amount of carbon dioxide giving not less than about 20% to not more than 100% carbonation of the light hydrocarbons and not exceeding the amount of carbon dioxide that will remain in solution at prevailing reservoir conditions, the carbonated hydrocarbons being liquid under the prevailing conditions of the underground structure, thereafter injecting about one-third to one and one-half pore volumes of carbonated water containing about 20% to about 100% of full carbonation, under pressure through said oil structure, following said operations with a water flood until oil is recovered from the oil structure via the output well, separating recovered oil from the mixture of light hydrocarbons and carbon dioxide, and recompressing said mixture and re-injecting it into the oil structure via said input well for use in the first operation hereof.

9. In the recovery of oil from an underground oil structure including connate water in an oil field having at least one input well and at least one output well that improvement which consists essentially in injecting under pressure through said oil structure from said input well to said output well light hydrocarbon solution of carbon dioxide, the hydrocarbon having a boiling point below 350° C., the amount of carbon dioxide giving not less than about 20% to not more than 100% carbonation of the light hydrocarbon, and not exceeding the amount of carbon dioxide that will remain in solution at prevailing reservoir conditions, the solution being liquid under the prevailing conditions of the underground structure, and controlling the injection of said hydrocarbon solution so that the total carbon dioxide injected as part of said solution shall substantially exceed six connate water pore volumes whereby oil is recovered from said oil structure, and separating recovered oil from the light hydrocarbons and carbon dioxide.

10. In the recoverey of oil from an underground oil structure in an oil field having at least one input well and at least one output well that improvement which consists essentially in injecting 10% to 20% of a pore volume of carbonated light hydrocarbons under pressure through said oil structure via said input well, the hydrocarbons having a boiling point below 350° C., the amount of carbon dioxide giving not less than about 20% to not more than 100% carbonation of the light hydrocarbons and not exceeding the amount of carbon dioxide that will remain in solution at prevailing reservoir conditions, the carbonated hydrocarbons being liquid under the prevailing conditions of the underground structure, thereafter injecting uncarbonated water under pressure through said oil structure, and following said operations with a water flood until oil is recovered from the oil structure via the output well.

11. In the recovery of oil from an underground oil structure in an oil field having at least one input well and at least one output well that improvement which consists essentially in injecting 10% to 20% of a pore volume of carbonated light hydrocarbons under pressure through said oil structure via said input well, the hydrocarbons having a boiling point below 350° C., the amount of carbon dioxide giving not less than about 20% to not more than 100% carbonation of the light hydrocarbons and not exceeding the amount of carbon dioxide that will remain in solution at prevailing reservoir conditions, the carbonated hydrocarbons being liquid under the prevailing conditions of the underground structure, and thereafter following up said injection with a gas drive under pressure through said oil structure, and following said operations with a water flood until oil is recovered from the oil structure via the output well.

References Cited in the file of this patent
UNITED STATES PATENTS

| | | |
|---|---|---|
| 1,511,067 | Russell | Oct. 7, 1924 |
| 1,826,371 | Spindler | Oct. 6, 1931 |
| 1,843,002 | Small | Jan. 26, 1932 |
| 2,412,765 | Buddrus et al. | Dec. 17, 1946 |
| 2,582,148 | Nelly | Jan. 8, 1952 |
| 2,623,596 | Whorton et al. | Dec. 30, 1952 |
| 2,669,306 | Teter et al. | Feb. 16, 1954 |